(12) United States Patent
Parvulescu et al.

(10) Patent No.: US 10,981,796 B2
(45) Date of Patent: Apr. 20, 2021

(54) PROCESS FOR THE PREPARATION OF A TITANIUM-CONTAINING ZEOLITE

(71) Applicant: BASF SE, Ludwigshafen am Rhein (DE)

(72) Inventors: Andrei-Nicolae Parvulescu, Ludwigshafen (DE); Ulrich Mueller, Ludwigshafen (DE); Regina Vogelsang, Ludwigshafen (DE); Nicole Sabine Bruns, Ludwigshafen (DE); Jan-Oliver Weidert, Ludwigshafen (DE)

(73) Assignee: BASF SE

( * ) Notice: Subject to any disclaimer, the term of this patent is extended or adjusted under 35 U.S.C. 154(b) by 0 days.

(21) Appl. No.: 16/349,364

(22) PCT Filed: Dec. 12, 2017

(86) PCT No.: PCT/EP2017/082366
§ 371 (c)(1),
(2) Date: May 13, 2019

(87) PCT Pub. No.: WO2018/108875
PCT Pub. Date: Jun. 21, 2018

(65) Prior Publication Data
US 2019/0367377 A1 Dec. 5, 2019

(30) Foreign Application Priority Data
Dec. 13, 2016 (EP) ..................... 16203604

(51) Int. Cl.
| | | |
|---|---|---|
| C01B 37/00 | (2006.01) | |
| C01B 39/00 | (2006.01) | |
| B01J 29/70 | (2006.01) | |
| B01J 29/89 | (2006.01) | |
| B01D 3/06 | (2006.01) | |
| B01J 29/86 | (2006.01) | |
| B01J 35/10 | (2006.01) | |
| C01B 39/02 | (2006.01) | |
| C01B 39/06 | (2006.01) | |

(52) U.S. Cl.
CPC .............. *C01B 37/005* (2013.01); *B01D 3/06* (2013.01); *B01J 29/7088* (2013.01); *B01J 29/86* (2013.01); *B01J 29/89* (2013.01); *B01J 35/1019* (2013.01); *C01B 37/007* (2013.01); *C01B 39/026* (2013.01); *C01B 39/065* (2013.01)

(58) Field of Classification Search
CPC ... C01B 39/026; C01B 39/065; C01B 37/005; B01J 29/89; B01J 29/7038; B01J 29/7088
See application file for complete search history.

(56) References Cited

U.S. PATENT DOCUMENTS

| | | | |
|---|---|---|---|
| 10,029,244 B2* | 7/2018 | Parvulescu | ........... C01B 39/085 |
| 10,195,598 B2 | 2/2019 | Riedel et al. | |
| 10,202,323 B2 | 2/2019 | Parvulescu et al. | |
| 10,202,324 B2 | 2/2019 | Vautravers et al. | |
| 10,308,580 B2 | 6/2019 | Rüdenauer et al. | |
| 10,329,238 B2 | 6/2019 | Weickgenannt et al. | |
| 2009/0110631 A1 | 4/2009 | Garcia-Martinez et al. | |
| 2015/0368115 A1 | 12/2015 | Parvulescu et al. | |
| 2016/0264428 A1 | 9/2016 | Moulton | |

OTHER PUBLICATIONS

U.S. Appl. No. 15/549,905, filed Aug. 9, 2017, US 2018/0022611 A1, Mathias Feyen, et al.
U.S. Appl. No. 15/752,991, filed Feb. 15, 2018, US 2018/0243691 A1, Ulrich Mueller, et al.
U.S. Appl. No. 15/779,218, filed May 25, 2018, US 2018/0345245 A1, Stefan Maurer, et al.
U.S. Appl. No. 16/086,251, filed Sep. 18, 2019, Benedikt Kalo.
U.S. Appl. No. 15/779,314, filed May 25, 2018, US 2018/0333696 A1, Julia Burckhart, et al.
U.S. Appl. No. 15/741,350, filed Jan. 2, 2018, US 2018/0361270 A1, Norbert Asprion, et al.
U.S. Appl. No. 16/060,260, filed Jun. 7, 2018, US 2018/0362353 A1, Nicolas Vautravers, et al.
U.S. Appl. No. 16/076,600, filed Aug. 8, 2018, US 2019/0077779 A1, Dominic Riedel, et al.
U.S. Appl. No. 16/321,252, filed Jan. 28, 2019, US 2019/0169037 A1, Natalia Trukhan, et al.
U.S. Appl. No. 16/308,730, filed Dec. 10, 2018, US 2019/0143272 A1.
U.S. Appl. No. 15/775,657, filed May 11, 2018, US 2018/0328601 A1, Matthias Weickert, et al.
U.S. Appl. No. 16/060,739, filed Jun. 8, 2018, US 2018/0362357 A1, Mathias Feyen, et al.
U.S. Appl. No. 16/318,221, filed Jan. 16, 2019, US 2019/0169149 A1, Joaquim Henrique Teles, et al.
U.S. Appl. No. 16/060,229, filed Jun. 7, 2018, US 2018/0362351 A1, Andrei-Nicolae Parvulescu, et al.
U.S. Appl. No. 16/315,345, filed Jan. 4, 2019, Joaquim Henrique Teles, et al.
U.S. Appl. No. 16/315,680, filed Jan. 7, 2019, Joaquim Henrique Teles, et al.
U.S. Appl. No. 15/348,217, filed Nov. 10, 2016, US 2017/0128916 A1, Michael Lejkowski, et al.
U.S. Appl. No. 16/310,645, filed Dec. 17, 2018, Andrei-Nicolae Parvulescu, et al.

(Continued)

*Primary Examiner* — David M Brunsman
(74) *Attorney, Agent, or Firm* — Faegre Drinker Biddle & Reath LLP

(57) ABSTRACT

A process comprising hydrothermally synthesizing a titanium-containing zeolitic material having framework type MWW in the presence of an MWW template compound, obtaining a mother liquor comprising water, a first portion of the MWW template compound and a titanium-containing zeolitic material having framework type MWW comprising a second portion of the MWW template compound, separating the first portion of the MWW template compound from the mother liquor and recycling the first portion of the MWW template compound into a hydrothermal synthesis of a titanium-containing zeolitic material having framework type MWW.

17 Claims, No Drawings

(56) References Cited

OTHER PUBLICATIONS

U.S. Appl. No. 16/304,511, filed Nov. 26, 2018, US 2019/0134564 A1, Mathias Feyen, et al.
U.S. Appl. No. 16/308,928, filed Dec. 11, 2018, US 2019/0144290 A1, Stefan Marx, et al.
U.S. Appl. No. 16/464,943, filed May 29, 2019, Andrei-Nicolae Parvulescu, et al.
U.S. Appl. No. 16/464,966, filed May 29, 2019, Andrei-Nicolae Parvulescu, et al.
U.S. Appl. No. 16/330,592, filed Mar. 5, 2019, Andrei-Nieolae Parvulescu.
U.S. Appl. No. 16/336,661, 521062U, Andrei-Nicolae Parvulescu.
International Search Report and Written Opinion dated Feb. 1, 2018 in PCT/EP2017/082366, 12 pages.

\* cited by examiner

PROCESS FOR THE PREPARATION OF A TITANIUM-CONTAINING ZEOLITE

This application is a 371 filing of PCT/EP2017/082366, filed Dec. 12, 2019.

The present invention is directed to a process for preparing a titanium-containing zeolitic material having framework type MWW which comprises preparing an aqueous synthesis mixture containing a deboronated zeolitic material a titanium source, and an MWW template compound, hydrothermally synthesizing a titanium-containing zeolitic material having framework type MWW from the aqueous synthesis mixture, and recycling a MWW template compound comprised in the aqueous mixture. Further, the present invention is directed to a titanium-containing zeolitic material having framework type MWW which is obtainable or obtained said process, and the use of the titanium-containing zeolitic material having framework type MWW.

TiMWW catalysts are usually prepared in a synthesis process involving one or more hydrothermal crystallization stages in the presence of an MWW template compound such as piperidine. Reference is made, for example, to WO 2013/117536 A1 where a multi-step process for preparing a TiMWW, in particular a ZnTiMWW catalyst, is described which comprises two hydrothermal synthesis stages. Generally, the MWW template compound is used in excess and is lost with the waste water or burned during calcination of the MWW zeolite. On the other hand, the MWW template compound is an expensive compound and represents a major cost contribution to the synthesis process.

Therefore, it was an object of the present invention to provide a process which renders the synthesis of a TiMWW catalyst more economic.

Surprisingly, it was found that this object can be solved by a process which comprises a specific recovering of the MWW template compound and a recycling of the recovered MWW template compound, in particular to one of the two hydrothermal synthesis stages described above.

Therefore, the present invention relates to a process for preparing a titanium-containing zeolitic material having framework type MWW, comprising (i) preparing a boron-containing zeolitic material having framework type MWW, wherein at least 99 weight-% of the zeolitic framework consist of B, Si, O and H, and wherein for preparing the boron-containing zeolitic material having framework type MWW, an MWW template compound is employed;

(ii) deboronating the boron-containing zeolitic material having framework type MWW prepared in (i), obtaining a deboronated zeolitic material having framework type MWW, wherein at least 99 weight-% of the zeolitic framework of the deboronated zeolitic material consist of B, Si, O and H and wherein the zeolitic framework of the deboronated zeolitic material has empty framework sites;

(iii) incorporating titanium into the deboronated zeolitic material obtained from (ii), comprising (iii.1) preparing an aqueous synthesis mixture containing the deboronated zeolitic material obtained from (ii), a titanium source, and an MWW template compound, wherein in the aqueous synthesis mixture obtained from (iii.1), the molar ratio of the MWW template compound relative to Si, calculated as $SiO_2$ and comprised in the deboronated zeolitic material obtained from (ii), is at least 0.5:1;

(iii.2) hydrothermally synthesizing a titanium-containing zeolitic material having framework type MWW from the aqueous synthesis mixture prepared in (iii.1), obtaining a mother liquor comprising water, a first portion of the MWW template compound employed in (iii.1), and a titanium-containing zeolitic material having framework type MWW comprising a second portion of the MWW template compound employed in (iii.1);

(iv) separating the titanium-containing zeolitic material having framework type MWW comprising the second portion of the MWW template compound from the mother liquor using a solid-liquid separation method, obtaining an aqueous mixture comprising the first portion of the MWW template compound and further obtaining the separated titanium-containing zeolitic material having framework type MWW comprising the second portion of the MWW template compound;

(v) recycling the first portion of the MWW template compound comprised in the aqueous mixture obtained from (iv) into at least one of (i) and (iii.2), preferably into (i).

Stage (iii)

Regarding incorporating titanium into the deboronated zeolitic material according to (iii), it is preferred that the titanium source according to (iii.1) is one or more of tetra-n-butylorthotitanate, tetra-tert-butylorthotitanate, tetraisopropylorthotitanate, tetraethylorthotitanate, titanium dioxide, and titanium tetrachloride. More preferably, the titanium source comprises tetra-n-butylorthotitanate. More preferably, the titanium source is tetra-n-butylorthotitanate.

Preferably, in the aqueous synthesis mixture prepared in (iii.1), the molar ratio of Ti, calculated as $TiO_2$ and comprised in the titanium source, relative to Si, calculated as $SiO_2$ and comprised in the deboronated zeolitic material obtained from (ii), is in the range of from 0.005:1 to 0.1:1, more preferably in the range of from 0.01:1 to 0.08:1, more preferably in the range of from 0.02:1 to 0.06:1. Preferred ranges are, for example, from 0.02:1 to 0.04:1 or from 0.03:1 to 0.05:1 or from 0.04:1 to 0.06:1.

Regarding the MWW template compound employed in (iii.1), it is preferred that the MWW template compound is one or more of piperidine, hexamethyleneimine, N,N,N,N', N',N'-hexamethyl-1,5-pentanediammonium ion, 1,4-bis(N-methylpyrrolidinium) butane, octyltrime-thylammonium hydroxide, heptyltrimethylammonium hydroxide, hexyltrimethylammonium hydroxide, and N,N,N-trimethyl-1-adamantylammonium hydroxide. More preferably, the MWW template compound comprises piperidine. More preferably, the MWW template compound is piperidine.

In the aqueous synthesis mixture prepared in (iii.1), the molar ratio of the MWW template compound relative to Si, calculated as $SiO_2$ and comprised in the deboronated zeolitic material obtained from (ii), is preferably in the range of from 0.5:1 to 1.4:1, more preferably in the range of from 0.5:1 to 1.7:1, more preferably in the range of from 0.8:1 to 1.5:1, more preferably in the range of from 1.0:1 to 1.3:1. Further in the aqueous synthesis mixture prepared in (ii.1), the molar ratio of $H_2O$ relative to Si, calculated as $SiO_2$ and comprised in the deboronated zeolitic material obtained from (ii), is preferably in the range of from 8:1 to 20:1, more preferably from 10:1 to 18:1, more preferably from 12:1 to 16:1.

Therefore, it is preferred that incorporating titanium into the deboronated zeolitic material according to (iii) comprises (iii.1) preparing an aqueous synthesis mixture containing the deboronated zeolitic material obtained from (ii), tetra-n-butylorthotitanate as the titanium source, and piperidine as the MWW template compound, wherein in the aqueous synthesis mixture obtained from (iii.1), the molar ratio of the piperidine relative to Si, calculated as $SiO_2$ and comprised in the deboronated zeolitic material obtained from (ii), is in the range of from 12:1 to 16:1.

Preferably, the hydrothermally synthesizing according to (iii.2) is carried out at a temperature of the aqueous synthesis mixture in the range of from 80 to 250° C., more preferably in the range of from 120 to 200° C., more preferably in the range of from 160 to 180° C. Preferably, the hydrothermally synthesizing according to (iii.2) is carried out for a period of time in the range of from 10 to 100 h, more preferably in the range of from 20 to 80 h, more preferably in the range of from 40 to 60 h. It is preferred that the hydrothermally synthesizing according to (iii.3) is carried out in a closed system, preferably under autogenous pressure.

Therefore, it is preferred that incorporating titanium into the deboronated zeolitic material according to (iii) comprises (iii.1) preparing an aqueous synthesis mixture containing the deboronated zeolitic material obtained from (ii), tetra-n-butylorthotitanate as the titanium source, and piperidine as the MWW template compound, wherein in the aqueous synthesis mixture obtained from (iii.1), the molar ratio of the piperidine relative to Si, calculated as $SiO_2$ and comprised in the deboronated zeolitic material obtained from (ii), is in the range of from 12:1 to 16:1;

(iii.2) hydrothermally synthesizing a titanium-containing zeolitic material having framework type MWW at a temperature of the aqueous synthesis mixture in the range of from 160 to 180° C. in a closed system under autogenous pressure from the aqueous synthesis mixture prepared in (iii.1), obtaining a mother liquor comprising water, a first portion of the tetra-n-butylorthotitanate employed in (iii.1), and a titanium-containing zeolitic material having framework type MWW comprising a second portion of the tetra-n-butylorthotitanate employed in (iii.1).

Preferably, neither during (iii.2), nor after (iii.2) and before (iv), the titanium-containing zeolitic material having framework type MWW is separated from its mother liquor. Generally, it is possible that the mother liquor obtained from (iii.2) is suitably concentrated or diluted prior to (iv).

Stage (iv)

Preferably, the mother liquor subjected to (iv) comprising the titanium-containing zeolitic material having framework type MWW which comprises the second portion of the piperidine has a solids content, optionally after concentrating or diluting, in the range of from 5 to 25 weight-%, more preferably in the range of from 10 to 20 weight-%, based on the total weight of the mother liquor comprising the titanium-containing zeolitic material having framework type MWW comprising the second portion of the piperidine.

Regarding the solid-liquid separation method used in (iv), generally every suitable method is conceivable, for example distillation or the like. Preferably, the solid-liquid separation method used in (iv) comprises rapid-drying, more preferably spray-drying, spin-flash drying or microwave drying, more preferably spray-drying the mother liquor comprising the titanium-containing zeolitic material having framework type MWW comprising the second portion of the MWW template compound employed in (iii.1). With regard to the spray-drying in (iv), the drying gas inlet temperature is preferably in the range of from 200 to 700° C., more preferably from 200 to 350° C., and the drying gas outlet temperature is preferably in the range of from 70 to 190° C.

Therefore, it is preferred that the process according to the present invention comprises (iii) incorporating titanium into the deboronated zeolitic material obtained from (ii), comprising
  (iii.1) preparing an aqueous synthesis mixture containing the deboronated zeolitic material obtained from (ii), tetra-n-butylorthotitanate as the titanium source, and piperidine as the MWW template compound, wherein in the aqueous synthesis mixture obtained from (iii.1), the molar ratio of the piperidine relative to Si, calculated as $SiO_2$ and comprised in the deboronated zeolitic material obtained from (ii), is in the range of from 12:1 to 16:1;
  (iii.2) hydrothermally synthesizing a titanium-containing zeolitic material having framework type MWW at a temperature of the aqueous synthesis mixture in the range of from 160 to 180° C. in a closed system under autogenous pressure from the aqueous synthesis mixture prepared in (iii.1), obtaining a mother liquor comprising water, a first portion of the tetra-n-butylorthotitanate employed in (iii.1), and a titanium-containing zeolitic material having framework type MWW comprising a second portion of the tetra-n-butylorthotitanate employed in (iii.1), and n-butanol;
(iv) separating the titanium-containing zeolitic material having framework type MWW comprising the second portion of the tetra-n-butylorthotitanate from the mother liquor using spray-drying, obtaining an aqueous mixture comprising the first portion of the tetra-n-butylorthotitanate and further obtaining the separated titanium-containing zeolitic material having framework type MWW comprising the second portion of the tetra-n-butylorthotitanate, and n-butanol.

It is preferred that at least 99 weight-%, more preferably at least 99.5 weight-%, more preferably at least 99.9 weight-% of the aqueous mixture obtained in (iv) consist of water, the first portion of the piperidine, and the n-butanol.

Stage (v)

According to the present invention, it is generally possible that according to (v), the first portion of the MWW template compound comprised in the aqueous mixture obtained from (iv) is recycled either into the hydrothermal synthesis according to (iii.2) or into the hydrothermal synthesis according to (i). Preferably, the first portion of the MWW template compound comprised in the aqueous mixture obtained from (iv) is recycled into (i).

Stage (x)

Generally, it may be conceivable that the aqueous mixture obtained from (iv) is recycled into either (iii.2) or (i), preferably (i). Preferably, the process of the invention comprises, after (iv) and before (v), (x) separating the n-butanol from the aqueous mixture obtained in (iv).

Regarding the separating of the n-butanol, generally every suitable method is possible. Preferably, separating the n-butanol from the aqueous mixture obtained in (iv) comprises subjecting the aqueous mixture obtained in (iv) to distillation. Preferably, the piperidine which is comprised in the aqueous mixture obtained in (iv) is suitably transferred into a piperidine salt. Therefore, it is preferred that in (x), separating the n-butanol from the aqueous mixture obtained in (iv) comprises (x.1) transferring the piperidine comprised in the aqueous mixture obtained in (iv) into a piperidine salt, comprising adding a piperidine salt-forming compound to the aqueous mixture obtained in (iv), obtaining an aqueous mixture comprising the piperidine salt and n-butanol;

(x.2) subjecting the aqueous mixture obtained from (x.1) to distillation in a distillation column, obtaining a top fraction being enriched in n-butanol, compared to the aqueous mixture obtained from (x.1), and obtaining a bottoms fraction being enriched in water and the piperidine salt, compared to the aqueous mixture obtained from (x.1).

Therefore, it is preferred that the process according to the present invention comprises
(iii) incorporating titanium into the deboronated zeolitic material obtained from (ii), comprising
  (iii.1) preparing an aqueous synthesis mixture containing the deboronated zeolitic material obtained from (ii), tetra-n-butylorthotitanate as the titanium source, and piperidine as the MWW template compound, wherein in the aqueous synthesis mixture obtained from (iii.1), the molar ratio of the piperidine relative to Si, calculated as $SiO_2$ and comprised in the deboronated zeolitic material obtained from (ii), is in the range of from 12:1 to 16:1;
  (iii.2) hydrothermally synthesizing a titanium-containing zeolitic material having framework type MWW at a temperature of the aqueous synthesis mixture in the range of from 160 to 180° C. in a closed system under autogenous pressure from the aqueous synthesis mixture prepared in (iii.1), obtaining a mother liquor comprising water, a first portion of the tetra-n-butylorthotitanate employed in (iii.1), and a titanium-containing zeolitic material having framework type MWW comprising a second portion of the tetra-n-butylorthotitanate employed in (iii.1), and n-butanol;
(iv) separating the titanium-containing zeolitic material having framework type MWW comprising the second portion of the tetra-n-butylorthotitanate from the mother liquor using spray-drying, obtaining an aqueous mixture comprising the first portion of the tetra-n-butylorthotitanate and further obtaining the separated titanium-containing zeolitic material having framework type MWW comprising the second portion of the tetra-n-butylorthotitanate, and n-butanol;
(x) separating the n-butanol from the aqueous mixture obtained in (iv) comprising
  (x.1) transferring the piperidine comprised in the aqueous mixture obtained in (iv) into a piperidine salt, comprising adding a piperidine salt-forming compound to the aqueous mixture obtained in (iv), obtaining an aqueous mixture comprising the piperidine salt and n-butanol;
  (x.2) subjecting the aqueous mixture obtained from (x.1) to distillation in a distillation column, obtaining a top fraction being enriched in n-butanol, compared to the aqueous mixture obtained from (x.1), and obtaining a bottoms fraction being enriched in water and the piperidine salt, compared to the aqueous mixture obtained from (x.1).

No specific restrictions exist regarding the piperidine salt-forming compound added in (x.1). Preferably, the piperidine salt-forming compound added in (x.1) comprises an inorganic acid or an organic acid or an inorganic and an organic acid, more preferably an inorganic acid, more preferably a strong inorganic acid, more preferably one or more of hydrobromic acid, hydroiodic acid, hydrochloric acid, nitric acid, perchloric acid, chloric acid, perbromic acid, bromic acid, periodic acid, iodic acid, and sulphuric acid, more preferably one or more of hydrochloric acid, nitric acid, and sulphuric acid. More preferably, the piperidine salt-forming compound added in (x.1) comprises sulphuric acid. More preferably, the piperidine salt-forming compound added in (x.1) is sulphuric acid.

The distillation according to (x.2) can be carried out using any conceivable set-up. Preferably, the distillation in (x.2) is carried out at a pressure at the top of the distillation column in the range of from 10 mbar to 100 bar, more preferably in the range of from 100 mbar to 40 bar. Preferably, the distillation in (x.2) is carried out at a temperature of the bottoms of the distillation column in the range of from 0 to 320° C., more preferably in the range of from 40 to 250° C. It is preferred that at least 0.1 weight-%, more preferably at least 5 weight-%, more preferably from 5 to 60 weight-% of the top fraction obtained in (x.2) consist of n-butanol. It is further preferred that at least 50 weight-%, more preferably at least 75 weight-%, more preferably at least 99 weight-% of the bottoms fraction obtained in (x.2) cnsist of water and the piperidine salt.

According to the present invention, it is preferred that after (x.2), the piperidine salt is transferred into piperidine and a respective salt, followed by a further suitable distillation in order to obtain piperidine in a form which is especially suitable for recycling. Therefore, it is preferred that (x) further comprises
  (x.3) transferring the piperidine salt comprised in the bottoms fraction obtained in (x.2) into piperidine and a further salt, comprising adding a salt-forming compound to the bottoms fraction, obtaining an aqueous mixture comprising the piperidine and the further salt;
  (x.4) subjecting the aqueous mixture obtained from (x.3) to distillation in a distillation column, obtaining a top fraction being enriched in water and piperidine, compared to the aqueous mixture obtained from (x.3), and obtaining a bottoms fraction being enriched in the further salt, compared to the aqueous mixture obtained from (x.3).

Thus, it is preferred that the process according to the present invention comprises
(iii) incorporating titanium into the deboronated zeolitic material obtained from (ii), comprising
  (iii.1) preparing an aqueous synthesis mixture containing the deboronated zeolitic material obtained from (ii), tetra-n-butylorthotitanate as the titanium source, and piperidine as the MWW template compound, wherein in the aqueous synthesis mixture obtained from (iii.1), the molar ratio of the piperidine relative to Si, calculated as $SiO_2$ and comprised in the deboronated zeolitic material obtained from (ii), is in the range of from 12:1 to 16:1;
  (iii.2) hydrothermally synthesizing a titanium-containing zeolitic material having framework type MWW at a temperature of the aqueous synthesis mixture in the range of from 160 to 180° C. in a closed system under autogenous pressure from the aqueous synthesis mixture prepared in (iii.1), obtaining a mother liquor comprising water, a first portion of the tetra-n-butylorthotitanate employed in (iii.1), and a titanium-containing zeolitic material having framework type MWW comprising a second portion of the tetra-n-butylorthotitanate employed in (iii.1), and n-butanol;
(iv) separating the titanium-containing zeolitic material having framework type MWW comprising the second portion of the tetra-n-butylorthotitanate from the mother liquor using spray-drying, obtaining an aqueous mixture comprising the first portion of the tetra-n-butylorthotitanate and further obtaining the separated titanium-containing zeolitic material having framework type MWW comprising the second portion of the tetra-n-butylorthotitanate, and n-butanol;
(x) separating the n-butanol from the aqueous mixture obtained in (iv) comprising
  (x.1) transferring the piperidine comprised in the aqueous mixture obtained in (iv) into a piperidine salt, comprising adding a piperidine salt-forming compound to the aqueous mixture obtained in (iv), obtaining an aqueous mixture comprising the piperidine salt and n-butanol;

(x.2) subjecting the aqueous mixture obtained from (x.1) to distillation in a distillation column, obtaining a top fraction being enriched in n-butanol, compared to the aqueous mixture obtained from (x.1), and obtaining a bottoms fraction being enriched in water and the piperidine salt, compared to the aqueous mixture obtained from (x.1);

(x.3) transferring the piperidine salt comprised in the bottoms fraction obtained in (x.2) into piperidine and a further salt, comprising adding a salt-forming compound to the bottoms fraction, obtaining an aqueous mixture comprising the piperidine and the further salt;

(x.4) subjecting the aqueous mixture obtained from (x.3) to distillation in a distillation column, obtaining a top fraction being enriched in water and piperidine, compared to the aqueous mixture obtained from (x.3), and obtaining a bottoms fraction being enriched in the further salt, compared to the aqueous mixture obtained from (x.3).

With regard to the salt-forming compound added in (x.3), no specific restrictions exist. Preferably, the salt-forming compound added in (x.3) comprises an inorganic base or an organic base or an inorganic base and an organic base, preferably having a pKb of less than 2.8 determined at 25° C., more preferably an inorganic base, more preferably one or more of sodium hydroxide and potassium hydroxide. More preferably, the salt-forming compound added in (x.3) comprises sodium hydroxide. More preferably, the salt-forming compound added in (x.3) is sodium hydroxide.

The distillation according to (x.4) can be carried out using any conceivable set-up. Preferably, the distillation in (x.4) is carried out a pressure at the top of the distillation column in the range of from 10 mbar to 100 bar, more preferably in the range of from 100 mbar to 40 bar. Preferably, the distillation in (x.4) is carried out at a temperature of the bottoms of the distillation column in the range of from 0 to 320° C., more preferably in the range of from 40 to 250° C. It is preferred that at least 50 weight-%, more preferably at least 75 weight-%, more preferably at least 99 weight-% of the top fraction obtained in (x.4) consist of water and piperidine. It is further preferred that at least 80 weight-%, more preferably at least 95 weight-%, more preferably at least 99.5 weight-% of the bottoms fraction obtained in (x.4) consist of water and the further salt.

According to the present invention, it is preferred that according to (v), the piperidine comprised in the top fraction obtained in (x.4) is recycled into at least one of (i) and (iii.2), preferably into (i). It is also preferred that according to (v), the top fraction obtained in (x.4) is recycled into at least one of (i) and (iii.2), preferably into (i).

Thus, it is preferred that the process according to the present invention comprises (iii) incorporating titanium into the deboronated zeolitic material obtained from (ii), comprising (iii.1) preparing an aqueous synthesis mixture containing the deboronated zeolitic material obtained from (ii), tetra-n-butylorthotitanate as the titanium source, and piperidine as the MWW template compound, wherein in the aqueous synthesis mixture obtained from (iii.1), the molar ratio of the piperidine relative to Si, calculated as $SiO_2$ and comprised in the deboronated zeolitic material obtained from (ii), is in the range of from 12:1 to 16:1;

(iii.2) hydrothermally synthesizing a titanium-containing zeolitic material having framework type MWW at a temperature of the aqueous synthesis mixture in the range of from 160 to 180° C. in a closed system under autogenous pressure from the aqueous synthesis mixture prepared in (iii.1), obtaining a mother liquor comprising water, a first portion of the tetra-n-butylorthotitanate employed in (iii.1), and a titanium-containing zeolitic material having framework type MWW comprising a second portion of the tetra-n-butylorthotitanate employed in (iii.1), and n-butanol;

(iv) separating the titanium-containing zeolitic material having framework type MWW comprising the second portion of the tetra-n-butylorthotitanate from the mother liquor using spray-drying, obtaining an aqueous mixture comprising the first portion of the tetra-n-butylorthotitanate and further obtaining the separated titanium-containing zeolitic material having framework type MWW comprising the second portion of the tetra-n-butylorthotitanate, and n-butanol;

(x) separating the n-butanol from the aqueous mixture obtained in (iv) comprising
 (x.1) transferring the piperidine comprised in the aqueous mixture obtained in (iv) into a piperidine salt, comprising adding a piperidine salt-forming compound to the aqueous mixture obtained in (iv), obtaining an aqueous mixture comprising the piperidine salt and n-butanol;
 (x.2) subjecting the aqueous mixture obtained from (x.1) to distillation in a distillation column, obtaining a top fraction being enriched in n-butanol, compared to the aqueous mixture obtained from (x.1), and obtaining a bottoms fraction being enriched in water and the piperidine salt, compared to the aqueous mixture obtained from (x.1);
 (x.3) transferring the piperidine salt comprised in the bottoms fraction obtained in (x.2) into piperidine and a further salt, comprising adding a salt-forming compound to the bottoms fraction, obtaining an aqueous mixture comprising the piperidine and the further salt;
 (x.4) subjecting the aqueous mixture obtained from (x.3) to distillation in a distillation column, obtaining a top fraction being enriched in water and piperidine, compared to the aqueous mixture obtained from (x.3), and obtaining a bottoms fraction being enriched in the further salt, compared to the aqueous mixture obtained from (x.3);

(v) recycling the piperidine comprised in the top fraction obtained in (x.4) or the top fraction obtained in (x.4) into (i).

Stage (i)

Regarding the MWW template compound employed in (i), it is preferred that the MWW template compound is one or more of piperidine, hexamethyleneimine, N,N,N,N',N', N'-hexamethyl-1,5-pentanediammonium ion, 1,4-bis(N-methylpyrrolidinium) butane, octyltrime-thylammonium hydroxide, heptyltrimethylammonium hydroxide, hexyltrimethylammonium hydroxide, and N,N,N-trimethyl-1-adamantylammonium hydroxide. More preferably, the MWW template compound comprises piperidine. More preferably, the MWW template compound is piperidine.

Generally, there are no specific restrictions how the boron-containing zeolitic material having framework type MWW is prepared. Preferably, preparing the boron-containing zeolitic material having framework type MWW in (i) comprises (i.1) preparing an aqueous synthesis mixture comprising a silicon source, a boron source, and the MWW template compound, wherein in the aqueous synthesis mixture obtained from (iii.1), the molar ratio of the MWW template compound relative to Si, calculated as $SiO_2$ and comprised in the silicon source, is preferably at least 0.4:1;

(i.2) hydrothermally synthesizing a precursor of the boron-containing zeolitic material having framework type MWW from the aqueous synthesis mixture prepared in (i.1), obtaining a mother liquor comprising the precursor of the boron-containing zeolitic material having framework type MWW, preferably obtaining a mother liquor comprising water, a first portion of the MWW template compound, and the precursor of the boron-containing zeolitic material having framework type MWW comprising a second portion of the MWW template compound;

(i.3) separating the precursor of the boron-containing zeolitic material having framework type MWW from the mother liquor using a solid-liquid separation method, obtaining the separated precursor of the boron-containing zeolitic material having framework type MWW, preferably separating the precursor of the boron-containing zeolitic material having framework type MWW comprising the second portion of the MWW template compound from the mother liquor using a solid-liquid separation method, obtaining the separated precursor of the boron-containing zeolitic material having framework type MWW;

(i.4) calcining the separated precursor of the boron-containing zeolitic material having framework type MWW, obtaining the boron-containing zeolitic material having framework type MWW.

Preferably, in the aqueous synthesis mixture prepared in (i.1), the molar ratio of the MWW template compound relative to Si, calculated as elemental silicon and comprised in the silicon source, is in the range of from 0.4:1 to 2.0:1, more preferably in the range of from 0.6:1 to 1.9:1, more preferably in the range of from 0.9:1 to 1.4:1. Preferably, in the aqueous synthesis mixture prepared in (i.1), the molar ratio of water relative to the silicon source, calculated as elemental silicon, is in the range of from 1:1 to 30:1, more preferably in the range of from 3:1 to 25:1, more preferably in the range of from 6:1 to 20:1. Preferably, in the aqueous synthesis mixture prepared in (i.1), the molar ratio of the boron source, calculated as elemental boron, relative to the silicon source, calculated as elemental silicon, is in the range of from 0.4:1 to 2.0:1, more preferably in the range of from 0.6:1 to 1.9:1, more preferably in the range of from 0.9:1 to 1.4:1.

Generally, every suitable boron source can be employed. Preferably, in (i.1), the boron source is one or more of boric acid, a borate, and boron oxide. More preferably, the boron source comprises boric acid. More preferably, the boron source comprises boric acid. Generally, every suitable silicon source can be employed. Preferably, in (i.1), the silicon source is one or more of fumed silica and colloidal silica. More preferably, the silicon source comprises colloidal silica, preferably ammonia-stabilized colloidal silica. More preferably, the silicon source is colloidal silica, preferably ammonia-stabilized colloidal silica.

Preferably, at least 99 weight-%, more preferably at least 99.5 weight-%, more preferably at least 99.9 weight-% of the aqueous synthesis mixture prepared in (i.1) consist of water, the boron source, the silicon source, and the MWW template compound.

Generally, the hydrothermal synthesizing according to (i.2) can be carried out according to any conceivable method. Preferably, in (i.2), the hydrothermally synthesizing is carried out at a temperature of the aqueous synthesis mixture in the range of from 160 to less than 180° C., more preferably in the range of from 170 to 177° C. Preferably, in (i.2), the hydrothermally synthesizing is carried out for a period of time in the range of from 1 to 72 h, more preferably in the range of from 6 to 60 h, more preferably in the range of from 12 to 50 h. Preferably, in (i.2), the hydrothermally synthesizing is carried out in a closed system, preferably under autogenous pressure.

Regarding the solid-liquid separation method used in (i.3), generally every suitable method is conceivable, for example distillation or the like. Therefore, it can be preferred that the solid-liquid separation method used in (i.3) comprises subjecting the mother liquor comprising water, the first portion of the MWW template compound, and the precursor of the boron-containing zeolitic material having framework type MWW comprising the second portion of the MWW template compound to distillation, obtaining the separated precursor of the boron-containing zeolitic material having framework type MWW and further obtaining an aqueous mixture comprising the MWW template compound. Preferably, at least 99 weight-%, more preferably at least 99.5 weight-%, more preferably at least 99.9 weight-% of the aqueous mixture comprising the MWW template compound obtained from distillation consist of water and the MWW template compound. In addition to the recycling according to (v), it is conceivable that, an additional MWW template compound recovering step, the aqueous mixture comprising the MWW template compound obtained from distillation is recycled into at least one of (i.1) and (iii.2). It is further conceivable that solid-liquid separation method used in (i.3) comprises subjecting the mother liquor comprising water, the first portion of the MWW template compound, and the precursor of the boron-containing zeolitic material having framework type MWW comprising the second portion of the MWW template compound to flashing wherein the MWW template compound is flashed out and that the flashed-out MWW template compound is preferably recycled into at least one of (i.1) and (iii.2).

Preferably, the pH of the mother liquor obtained from (i.2) is above 10, more preferably in the range of from 10.5 to 12, more preferably in the range of from 11 to 11.5. Further preferably, in (i.3), the pH of the mother liquor obtained in (i.2) is adjusted to a value in the range of from 6.5 to 8.5, more preferably in the range of from 7 to 8. The adjustment of the pH can be performed by any suitable method. Preferably, in (i.3), the pH is adjusted by a method comprising adding an acid to the mother liquor obtained from (i.2) containing the precursor of the boron-containing zeolitic material having framework type MWW, wherein the adding is preferably carried out at least partially under stirring. Preferably, the adding is carried out at a temperature of the mother liquor in the range of from 10 to 70° C., preferably in the range of from 20 to 70° C., more preferably in the range of from 30 to 65° C., more preferably in the range of from 40 to 60° C. Preferably, in (i.3), the acid is an inorganic acid, more preferably an aqueous solution containing the inorganic acid, wherein the inorganic acid is preferably one or more of phosphoric acid, sulphuric acid, hydrochloric acid, the inorganic acid preferably comprising, more preferably being, nitric acid. Preferably, the method according to (i.3) additionally comprises stirring the mother liquor to which the acid was added according to (i.3), wherein the stirring is preferably carried out at a temperature in the range of from 10 to 70° C., more preferably in the range of from 20 to 70° C., more preferably in the range of from 25 to 65° C., more preferably in the range of from 30 to 60° C.

Preferably, the precursor of the boron-containing zeolitic material having framework type MWW from the mother liquor is separated from the mother liquor, preferably from the pH-adjusted mother liquor, preferably by filtration in a filtration device. It is preferred that (i.3) further comprises washing the precursor of the boron-containing zeolitic material having framework type MWW, preferably the filter cake obtained as described above, wherein the washing is preferably performed using water as washing agent.

Preferably, the preferably washed precursor of the boron-containing zeolitic material having framework type MWW is then suitably dried, preferably using a gas atmosphere having a temperature in the range of from 10 to 200° C., preferably in the range of from 20 to 50° C., more preferably in the range of from 20 to 40° C., more preferably in the range of from 20 to 30° C., wherein the gas stream is preferably a nitrogen stream.

Further preferably, the process comprises preparing a suspension, preferably an aqueous suspension, comprising the precursor of the boron-containing zeolitic material having framework type MWW, wherein the suspension preferably has a solids content in the range of from 10 to 20 weight-%, more preferably in the range of from 12 to 18 weight-%, more preferably in the range of from 14 to 16 weight-%; spray-drying said suspension obtaining a spray powder comprising the precursor of the boron-containing zeolitic material having framework type MWW; calcining the spray-powder comprising the precursor of the boron-containing zeolitic material having framework type MWW, preferably at a temperature in the range of from 500 to 700° C., more preferably in the range of from 550 to 675° C., more preferably in the range of from 600 to 650° C. preferably for a period of time in the range of from 0.1 to 24 h, more preferably in the range of from 1 to 24 h, more preferably in the range of from 2 to 18 h, more preferably in the range of from 4 to 12 h, obtaining a spray-powder of which at least 99 weight-%, more preferably at least 99.5 weight-% consist of the boron-containing zeolitic material having framework type MWW.

Preferably, the boron content of the boron-containing zeolitic material having framework type MWW comprised in the spray-powder, calculated as elemental boron, is at least 1 weight-%, more preferably in the range of from 1.0 to 2.2 weight-%, more preferably in the range of from 1.2 to 1.8 weight-%, and the silicon content of the boron-containing zeolitic material having framework type MWW comprised in the spray powder, calculated as elemental silicon, is at least 37 weight-%, preferably in the range of from 40 to 50 weight-%, more preferably from 41 to 45 weight-%, based on the total weight of the boron-containing zeolitic material having framework type MWW.

Thus, it is preferred that the process according to the present invention comprises (i) preparing a boron-containing zeolitic material having framework type MWW comprising
- (i.1) preparing an aqueous synthesis mixture comprising a silica sol as silicon source, boric acid as boron source, and piperidine as MWW template compound, wherein in the aqueous synthesis mixture obtained from (iii.1), the molar ratio of the piperidine relative to Si, calculated as SiO$_2$ and comprised in the silica sol is at least 0.4:1;
- (i.2) hydrothermally synthesizing a precursor of the boron-containing zeolitic material having framework type MWW from the aqueous synthesis mixture prepared in (i.1), obtaining a mother liquor comprising water, a first portion of the piperidine, and the precursor of the boron-containing zeolitic material having framework type MWW comprising a second portion of the piperidine;
- (i.3) separating the precursor of the boron-containing zeolitic material having framework type MWW comprising the second portion of the piperidine from the mother liquor using a solid-liquid separation method, obtaining the separated precursor of the boron-containing zeolitic material having framework type MWW;
- (i.4) calcining the separated precursor of the boron-containing zeolitic material having framework type MWW, obtaining the boron-containing zeolitic material having framework type MWW;

(ii) deboronating the boron-containing zeolitic material having framework type MWW prepared in (i), obtaining a deboronated zeolitic material having framework type MWW, wherein at least 99 weight-% of the zeolitic framework of the deboronated zeolitic material consist of B, Si, O and H and wherein the zeolitic framework of the deboronated zeolitic material has empty framework sites;

(iii) incorporating titanium into the deboronated zeolitic material obtained from (ii), comprising
- (iii.1) preparing an aqueous synthesis mixture containing the deboronated zeolitic material obtained from (ii), tetra-n-butylorthotitanate as the titanium source, and piperidine as the MWW template compound, wherein in the aqueous synthesis mixture obtained from (iii.1), the molar ratio of the piperidine relative to Si, calculated as SiO$_2$ and comprised in the deboronated zeolitic material obtained from (ii), is in the range of from 12:1 to 16:1;
- (iii.2) hydrothermally synthesizing a titanium-containing zeolitic material having framework type MWW at a temperature of the aqueous synthesis mixture in the range of from 160 to 180° C. in a closed system under autogenous pressure from the aqueous synthesis mixture prepared in (iii.1), obtaining a mother liquor comprising water, a first portion of the tetra-n-butylorthotitanate employed in (iii.1), and a titanium-containing zeolitic material having framework type MWW comprising a second portion of the tetra-n-butylorthotitanate employed in (iii.1), and n-butanol;

(iv) separating the titanium-containing zeolitic material having framework type MWW comprising the second portion of the tetra-n-butylorthotitanate from the mother liquor using spray-drying, obtaining an aqueous mixture comprising the first portion of the tetra-n-butylorthotitanate and further obtaining the separated titanium-containing zeolitic material having framework type MWW comprising the second portion of the tetra-n-butylorthotitanate, and n-butanol;

(x) separating the n-butanol from the aqueous mixture obtained in (iv) comprising
- (x.1) transferring the piperidine comprised in the aqueous mixture obtained in (iv) into a piperidine salt, comprising adding a piperidine salt-forming compound to the aqueous mixture obtained in (iv), obtaining an aqueous mixture comprising the piperidine salt and n-butanol;
- (x.2) subjecting the aqueous mixture obtained from (x.1) to distillation in a distillation column, obtaining a top fraction being enriched in n-butanol, compared to the aqueous mixture obtained from (x.1), and obtaining a bottoms fraction being enriched in water and the piperidine salt, compared to the aqueous mixture obtained from (x.1);
- (x.3) transferring the piperidine salt comprised in the bottoms fraction obtained in (x.2) into piperidine and a further salt, comprising adding a salt-forming compound to the bottoms fraction, obtaining an aqueous mixture comprising the piperidine and the further salt;

(x.4) subjecting the aqueous mixture obtained from (x.3) to distillation in a distillation column, obtaining a top fraction being enriched in water and piperidine, compared to the aqueous mixture obtained from (x.3), and obtaining a bottoms fraction being enriched in the further salt, compared to the aqueous mixture obtained from (x.3);

(v) recycling the piperidine comprised in the top fraction obtained in (x.4) or the top fraction obtained in (x.4) into (i).

Stage (ii)

Generally, the deboronating according to (ii) can be carried out using any suitable method. Preferably, in (ii), the boron-containing zeolitic material having framework type MWW prepared in (i) is deboronated by treating the boron-containing zeolitic material having framework type MWW with a liquid solvent system, obtaining the deboronated zeolitic material having framework type MWW, wherein at least 99 weight-% of the zeolitic framework of the deboronated zeolitic material consist of B, Si, O and H and wherein the zeolitic framework of the deboronated zeolitic material has empty framework sites.

Preferably, the deboronated zeolitic material having framework type MWW obtained from (ii) has a molar ratio of boron, calculated as $B_2O_3$, relative to silicon, calculated as $SiO_2$, of at most 0.02:1, more preferably at most 0.01:1, more preferably in the range of from 0.001:1 to 0.01:1, more preferably in the range of from 0.001:1 to 0.003:1, wherein preferably at least 99.5 weight-%, more preferably least 99.9 weight-% of the deboronated zeolitic material having framework type MWW consist of B, Si, O and H.

Preferably, in (ii), the liquid solvent system is one or more of water, methanol, ethanol, propanol, ethane-1,2-diol, propane-1,2-diol, propane-1,3-diol, and propane-1,2,3-triol, wherein preferably, the liquid solvent system does not contain an inorganic acid and an organic acid. Prior to (ii), the weight ratio of the liquid solvent system relative to the zeolitic material having framework type MWW is preferably in the range of from 5:1 to 40:1, more preferably in the range of from 7.5:1 to 30:1, more preferably in the range of from 10:1 to 20:1. In (ii), the treating with the liquid solvent system is carried out at a temperature of the liquid solvent system preferably in the range of from 50 to 125° C., more preferably in the range of from 90 to 115° C., more preferably in the range of from 95 to 105° C. Further preferably, in (ii), the treating with the liquid solvent system is carried out for a period in the range of from 6 to 20 h, preferably in the range of from 7 to 17 h, more preferably in the range of from 8 to 12 h. It is preferred that in (ii), the treating with the liquid solvent system is carried out in an open system under reflux or in a closed system without reflux. Further preferably, (ii) comprises drying, preferably spray-drying the deboronated zeolitic material having framework type MWW. The respectively obtained deboronated zeolitic material having framework type MWW is preferably not subjected to calcination prior to (iii).

Stage (vi)

As described above, it is preferred that in (iv), the titanium-containing zeolitic material having framework type MWW comprising the second portion of the MWW template compound, preferably tetra-n-butylorthotitanate, is separated from the mother liquor using spray-drying. With regard to the respectively obtained titanium-containing zeolitic material having framework type MWW comprising the second portion of the MWW template compound, it is preferred, in a subsequent stage (vi), (vi.1) to treat the titanium-containing zeolitic material having framework type MWW comprising the second portion of the MWW template compound obtained from (iv) with an aqueous solution having a pH of at most 5;

(vi.2) to separate the titanium-containing zeolitic material having framework type MWW obtained from (vi.1) from the aqueous solution, optionally followed by washing the separated the titanium-containing zeolitic material having framework type MWW;

(vi.3) to prepare a suspension, preferably an aqueous suspension containing the titanium-containing zeolitic material having framework type MWW obtained from (vi.1), preferably from (vi.2), said suspension having a solids content preferably in the range of from 5 to 25 weight-%, more preferably from 10 to 20 weight-%, based on the total weight of the suspension, and subjecting the suspension to spray-drying;

(vi.4) to calcine the titanium-containing zeolitic material having framework type MWW obtained from (vi.1), preferably from (vi.2), more preferably from (vi.3), wherein the calcining is preferably carried out at a temperature in the range of from 400 to 800° C., more preferably from 600 to 700° C.

Yet further, the present invention relates to a titanium-containing zeolitic material having framework type MWW which is obtainable or obtained by a process as described above comprising stages (i) to (v), preferably comprising stages (i) to (vi). Further, the present invention relates to the use of said titanium-containing zeolitic material having framework type MWW as a catalyst, as a catalyst support, and/or as a catalyst precursor, wherein it is preferred that the titanium-containing zeolitic material having framework type MWW is used as a catalyst for the epoxidation of an olefin, wherein at least one precious metal is option-ally contained in or supported on the titanium-containing zeolitic material having framework type MWW. Yet further, it is preferred that said titanium-containing zeolitic material having framework type MWW is used as a catalyst precursor in a process for preparing a catalyst, wherein the process for preparing the catalyst comprises impregnating the titanium-containing zeolitic material having framework type MWW with at least one zinc containing compound and optionally forming the impregnated titanium-containing zeolitic material having framework type MWW to a molding, said molding optionally containing at least one binder, preferably a silica binder, as described, for example, in general and in detail in WO 2013/117536 A1. Still further, the present invention relates to a method for catalytically converting a hydrocarbon compound comprising bringing the hydrocarbon compound in contact with a catalyst comprising the titanium-containing zeolitic material having framework type MWW as described above, wherein the hydrocarbon conversion is preferably an epoxidation of an olefin, wherein at least one precious metal is optionally contained in or supported on the zeolitic material having framework type MWW. Still further, the present invention relates to a method for preparing a catalyst, comprising impregnating the titanium-containing zeolitic material having framework type MWW as described above with at least one zinc containing compound and optionally forming the impregnated titanium-containing zeolitic material having framework type MWW to a molding, said molding optionally containing at least one binder, preferably a silica binder, as described, for example, in general and in detail in WO 2013/117536 A1.

The present invention is further illustrated by the following set of embodiments and combinations of embodiments resulting from the dependencies and back-references as indicated. In particular, it is noted that in each instance where a range of embodiments is mentioned, for example in the context of a term such as "The process of any one of embodiments 1 to 4", every embodiment in this range is meant to be explicitly disclosed for the skilled person, i.e. the wording of this term is to be understood by the skilled person as being synonymous to "The process of any one of embodiments 1, 2, 3, and 4".

1. A process for preparing a titanium-containing zeolitic material having framework type MWW, comprising
   (i) preparing a boron-containing zeolitic material having framework type MWW, wherein at least 99 weight-% of the zeolitic framework consist of B, Si, O and H, and wherein for preparing the boron-containing zeolitic material having framework type MWW, an MWW template compound is employed;
   (ii) deboronating the boron-containing zeolitic material having framework type MWW prepared in (i), obtaining a deboronated zeolitic material having framework type MWW, wherein at least 99 weight-% of the zeolitic framework of the deboronated zeolitic material consist of B, Si, O and H and wherein the zeolitic framework of the deboronated zeolitic material has empty framework sites;
   (iii) incorporating titanium into the deboronated zeolitic material obtained from (ii), comprising
      (iii.1) preparing an aqueous synthesis mixture containing the deboronated zeolitic material obtained from (ii), a titanium source, and an MWW template compound, wherein in the aqueous synthesis mixture obtained from (iii.1), the molar ratio of the MWW template compound relative to Si, calculated as $SiO_2$ and comprised in the deboronated zeolitic material obtained from (ii), is at least 0.5:1;
      (iii.2) hydrothermally synthesizing a titanium-containing zeolitic material having framework type MWW from the aqueous synthesis mixture prepared in (iii.1), obtaining a mother liquor comprising water, a first portion of the MWW template compound employed in (iii.1), and a titanium-containing zeolitic material having framework type MWW comprising a second portion of the MWW template compound employed in (iii.1);
   (iv) separating the titanium-containing zeolitic material having framework type MWW comprising the second portion of the MWW template compound from the mother liquor using a solid-liquid separation method, obtaining an aqueous mixture comprising the first portion of the MWW template compound and further obtaining the separated titanium-containing zeolitic material having framework type MWW comprising the second portion of the MWW template compound;
   (v) recycling the first portion of the MWW template compound comprised in the aqueous mixture obtained from (iv) into at least one of (i) and (iii.2), preferably into (i).
2. The process of embodiment 1, wherein in (iii.1), the titanium source is one or more of tetra-n-butylorthotitanate, tetra-tert-butylorthotitanate, tetraisopropylorthotitanate, tetraethylorthotitanate, titanium dioxide, titanium tetrachloride.
3. The process of embodiment 1 or 2, wherein in (iii.1), the titanium source is tetra-n-butylorthotitanate.
4. The process of any one of embodiments 1 to 3, wherein in the aqueous synthesis mixture prepared in (iii.1), the molar ratio of Ti, calculated as $TiO_2$ and comprised in the titanium source, relative to Si, calculated as $SiO_2$ and comprised in the deboronated zeolitic material obtained from (ii), is in the range of from 0.005:1 to 0.1:1, preferably in the range of from 0.01:1 to 0.08:1, more preferably in the ranger of from 0.02:1 to 0.06:1.
5. The process of any one of embodiments 1 to 4, wherein the MWW template compound employed in (iii.1) comprises, preferably is, one or more of piperidine, hexamethyleneimine, N,N,N,N',N',N'-hexamethyl-1,5-pentanediammonium ion, 1,4-bis(N-methylpyrrolidinium) butane, octyltrimethylammonium hydroxide, heptyltrimethylammonium hydroxide, hexyltrimethylammonium hydroxide, and N,N,N-trimethyl-1-adamantylammonium hydroxide.
6. The process of any one of embodiments 1 to 5, wherein the MWW template compound employed in (iii.1) is piperidine.
7. The process of any one of embodiments 1 to 6, wherein in the aqueous synthesis mixture prepared in (iii.1), the molar ratio of the MWW template compound relative to Si, calculated as $SiO_2$ and comprised in the deboronated zeolitic material obtained from (ii), is in the range of from 0.5:1 to 1.4:1, preferably in the range of from 0.5:1 to 1.7:1, more preferably in the range of from 0.8:1 to 1.5:1, more preferably in the range of from 1.0:1 to 1.3:1.
8. The process of any one of embodiments 1 to 7, wherein in the aqueous synthesis mixture prepared in (ii.1), the molar ratio of $H_2O$ relative to Si, calculated as $SiO_2$ and comprised in the deboronated zeolitic material obtained from (ii), is in the range of from 8:1 to 20:1, preferably from 10:1 to 18:1, more preferably from 12:1 to 16:1.
9. The process of any one of embodiments 1 to 8, wherein in (iii.2), the hydrothermally synthesizing is carried out at a temperature of the aqueous synthesis mixture in the range of from 80 to 250° C., preferably in the range of from 120 to 200° C., more preferably in the range of from 160 to 180° C.
10. The process of any one of embodiments 1 to 9, wherein in (iii.2), the hydrothermally synthesizing is carried out fora period of time in the range of from 10 to 100 h, more preferably in the range of from 20 to 80 h, more preferably in the range of from 40 to 60 h.
11. The process of any one of embodiments 1 to 10, wherein in (iii.2), the hydrothermally synthesizing is carried out in a closed system under autogenous pressure.
12. The process of any one of embodiments 1 to 11, wherein neither during (iii.2), nor after (iii.2) and before (iv), the titanium-containing zeolitic material having framework type MWW is separated from its mother liquor.
13. The process of any one of embodiments 1 to 12, wherein the mother liquor subjected to (iv) comprising the titanium-containing zeolitic material having framework type MWW comprising the second portion of the piperidine has a solids content, optionally after concentrating or diluting, in the range of from 5 to 25 weight-%, preferably in the range of from 10 to 20 weight-%, based on the total weight of the mother liquor comprising the titanium-containing zeolitic material having framework type MWW comprising the second portion of the piperidine.
14. The process of any one of embodiments 1 to 13, wherein the solid-liquid separation method used in (iv) comprises rapid-drying, preferably spray-drying, spin-flash drying or microwave drying, more preferably spray-drying the mother liquor comprising the titanium-containing zeolitic material having framework type MWW comprising the second portion of the MWW template compound employed in (iii.1).

15. The process of embodiment 14, wherein during spray-drying in (iv), the drying gas inlet temperature is in the range of from 200 to 700° C., preferably from 200 to 350° C., and the drying gas outlet temperature is in the range of from 70 to 190° C.

16. The process of any one of embodiments 1 to 15, wherein in (iii.1), the titanium source is tetra-n-butylorthotitanate, wherein the mother liquor obtained in (iii.2) comprises water, the first portion of the MWW template compound employed in (iii.1), the titanium-containing zeolitic material having framework type MWW comprising the second portion of the MWW template compound employed in (iii.1), and n-butanol, and wherein the aqueous mixture obtained in (iv) comprises the first portion of the MWW template compound and n-butanol.

17. The process of any one of embodiments 1 to 16, wherein in (iii.1), the titanium source is tetra-n-butylorthotitanate and the MWW template compound is piperidine, wherein the mother liquor obtained in (iii.2) comprises water, the first portion of the piperidine, the titanium-containing zeolitic material having framework type MWW comprising the second portion of the piperidine, and n-butanol, and wherein the aqueous mixture obtained in (iv) comprises the first portion of the piperidine and n-butanol.

18. The process of any one of embodiments 1 to 17, wherein in (v), the first portion of the MWW template compound comprised in the aqueous mixture obtained from (iv) is recycled into (i).

19. The process of embodiment 18, wherein at least 99 weight-%, preferably at least 99.5 weight-%, more preferably at least 99.9 weight-% of the aqueous mixture obtained in (iv) consist of water, the first portion of the piperidine, and n-butanol.

20. The process of embodiment 18 or 19, comprising, after (iv) and before (v), (x) separating the n-butanol from the aqueous mixture obtained in (iv).

21. The process of embodiment 20, wherein in (x), separating the n-butanol from the aqueous mixture obtained in (iv) comprises subjecting the aqueous mixture obtained in (iv) to distillation.

22. The process of embodiment 20 or 21, wherein in (x), separating the n-butanol from the aqueous mixture obtained in (iv) comprises
    (x.1) transferring the piperidine comprised in the aqueous mixture obtained in (iv) into a piperidine salt, comprising adding a piperidine salt-forming compound to the aqueous mixture obtained in (iv), obtaining an aqueous mixture comprising the piperidine salt and n-butanol;
    (x.2) subjecting the aqueous mixture obtained from (x.1) to distillation in a distillation column, obtaining a top fraction being enriched in n-butanol, compared to the aqueous mixture obtained from (x.1), and obtaining a bottoms fraction being enriched in water and the piperidine salt, compared to the aqueous mixture obtained from (x.1).

23. The process of embodiment 22, wherein the piperidine salt-forming compound added in (x.1) comprises an inorganic acid or an organic acid or an inorganic and an organic acid, preferably an inorganic acid, more preferably a strong inorganic acid, more preferably one or more of hydrobromic acid, hydroiodic acid, hydrochloric acid, nitric acid, perchloric acid, chloric acid, perbromic acid, bromic acid, periodic acid, iodic acid, and sulphuric acid, more preferably one or more of hydrochloric acid, nitric acid, and sulphuric acid.

24. The process of embodiment 22 or 23, wherein the piperidine salt-forming compound added in (x.1) comprises, preferably is, sulphuric acid.

25. The process of any one of embodiments 22 to 24, wherein the distillation in (x.2) is carried out at a pressure at the top of the distillation column in the range of from 10 mbar to 100 bar, preferably in the range of from 100 mbar to 40 bar.

26. The process of any one of embodiments 22 to 25, wherein the distillation in (x.2) is carried out at a temperature of the bottoms of the distillation column in the range of from 0 to 320° C., preferably in the range of from 40 to 250° C.

27. The process of any one of embodiments 22 to 26, wherein at least 0.1 weight-%, preferably at least 5 weight-%, more preferably from 5 to 60 weight-% of the top fraction obtained in (x.2) consist of n-butanol.

28. The process of any one of embodiments 22 to 27, wherein at least 50 weight-%, preferably at least 75 weight-%, more preferably at least 99 weight-% of the bottoms fraction obtained in (x.2) consist of water and the piperidine salt.

29. The process of any one of embodiments 22 to 28, further comprising
    (x.3) transferring the piperidine salt comprised in the bottoms fraction obtained in (x.2) into piperidine and a further salt, comprising adding a salt-forming compound to the bottoms fraction, obtaining an aqueous mixture comprising the piperidine and the further salt;
    (x.4) subjecting the aqueous mixture obtained from (x.3) to distillation in a distillation column, obtaining a top fraction being enriched in water and piperidine, compared to the aqueous mixture obtained from (x.3), and obtaining a bottoms fraction being enriched in the further salt, compared to the aqueous mixture obtained from (x.3).

30. The process of embodiment 29, wherein the salt-forming compound added in (x.3) comprises an inorganic base or an organic base or an inorganic and an organic base, preferably having a pKb of less than 2.8 determined at 25° C., preferably an inorganic base, more preferably one or more of sodium hydroxide and potassium hydroxide.

31. The process of embodiment 29 or 30, wherein the salt-forming compound added in (x.3) comprises, preferably is, sodium hydroxide.

32. The process of any one of embodiments 29 to 31, wherein the distillation in (x.4) is carried out at a pressure at the top of the distillation column in the range of from 10 mbar to 100 bar, preferably in the range of from 100 mbar to 40 bar.

33. The process of any one of embodiments 29 to 32, wherein the distillation in (x.4) is carried out at a temperature of the bottoms of the distillation column in the range of from 0 to 320° C., preferably in the range of from 40 to 250° C.

34. The process of any one of embodiments 29 to 33, wherein at least 50 weight-%, preferably at least 75 weight-%, more preferably at least 99 weight-% of the top fraction obtained in (x.4) consist of water and piperidine.

35. The process of any one of embodiments 29 to 34, wherein at least 80 weight-%, preferably at least 95 weight-%, more preferably at least 99.5 weight-% of the bottoms fraction obtained in (x.4) consist of water and the further salt.

36. The process of any one of embodiments 29 to 35, wherein (v) comprises recycling the piperidine comprised in the top fraction obtained in (x.4) into at least one of (i) and (iii.2), preferably into (i).
37. The process of any one of embodiments 29 to 36, wherein (v) comprises recycling the top fraction obtained in (x.4) into at least one of (i) and (iii.2), preferably into (i).
38. The process of any one of embodiments 1 to 37, wherein the MWW template compound employed in (i) comprises, preferably is, one or more of piperidine, hexamethy-leneimine, N,N,N,N',N',N'-hexamethyl-1,5-pentanediammonium ion, 1,4-bis(N-methylpyrrolidinium) butane, octyltrimethylammonium hydroxide, heptyltrimethylammonium hydroxide, hexyltrimethylammonium hydroxide, and N,N,N-trimethyl-1-adamantylammonium hydroxide.
39. The process of any one of embodiments 1 to 38, wherein the MWW template compound employed in (i) comprises, preferably is, piperidine.
40. The process of any one of embodiments 1 to 39, wherein preparing the boron-containing zeolitic material having framework type MWW in (i) comprises
    (i.1) preparing an aqueous synthesis mixture comprising a silicon source, a boron source, and the MWW template compound;
    (i.2) hydrothermally synthesizing a precursor of the boron-containing zeolitic material having framework type MWW from the aqueous synthesis mixture prepared in (i.1), obtaining a mother liquor comprising the precursor of the boron-containing zeolitic material having framework type MWW;
    (i.3) separating the precursor of the boron-containing zeolitic material having frame-work type MWW from the mother liquor using a solid-liquid separation method, obtaining the separated precursor of the boron-containing zeolitic material having framework type MWW;
    (i.4) calcining the separated precursor of the boron-containing zeolitic material having framework type MWW, obtaining the boron-containing zeolitic material having framework type MWW.
41. The process of any one of embodiments 1 to 40, wherein preparing the boron-containing zeolitic material having framework type MWW in (i) comprises
    (i.1) preparing an aqueous synthesis mixture comprising a silicon source, a boron source, and the MWW template compound; wherein in the aqueous synthesis mixture obtained from (iii.1), the molar ratio of the MWW template compound relative to Si, calculated as $SiO_2$ and comprised in the silicon source, is at least 0.4:1,
    (i.2) hydrothermally synthesizing a precursor of the boron-containing zeolitic material having framework type MWW from the aqueous synthesis mixture prepared in (i.1), obtaining a mother liquor comprising water, a first portion of the MWW template compound, and the precursor of the boron-containing zeolitic material having framework type MWW comprising a second portion of the MWW template compound;
    (i.3) separating the precursor of the boron-containing zeolitic material having framework type MWW comprising the second portion of the MWW template compound from the mother liquor using a solid-liquid separation method, obtaining the separated precursor of the boron-containing zeolitic material having framework type MWW;
    (i.4) calcining the separated precursor of the boron-containing zeolitic material having framework type MWW, obtaining the boron-containing zeolitic material having framework type MWW.
42. The process of embodiment 41, wherein in the aqueous synthesis mixture prepared in (i.1), the molar ratio of the MWW template compound relative to Si, calculated as elemental silicon and comprised in the silicon source, is in the range of from 0.4:1 to 2.0:1, preferably in the range of from 0.6:1 to 1.9:1, more preferably in the range of from 0.9:1 to 1.4:1.
43. The process of embodiment 41 or 42, wherein in the aqueous synthesis mixture prepared in (i.1), the molar ratio of water relative to the silicon source, calculated as elemental silicon, is in the range of from 1:1 to 30:1, preferably in the range of from 3:1 to 25:1, more preferably in the range of from 6:1 to 20:1.
44. The process of any one of embodiments 41 to 43, wherein in the aqueous synthesis mixture prepared in (i.1), the molar ratio of the boron source, calculated as elemental boron, relative to the silicon source, calculated as elemental silicon, is in the range of from 0.4:1 to 2.0:1, preferably in the range of from 0.6:1 to 1.9:1, more preferably in the range of from 0.9:1 to 1.4:1.
45. The process of any one of embodiments 41 to 44, wherein in (i.1), the boron source is one or more of boric acid, a borate, and boron oxide.
46. The process of any one of embodiments 41 to 45, wherein in (i.1), the boron source comprises, preferably is, boric acid.
47. The process of any one of embodiments 41 to 46, wherein in (i.1), the silicon source is one or more of fumed silica and colloidal silica.
48. The process of any one of embodiments 41 to 47, wherein in (i.1), the silicon source comprises, preferably is, colloidal silica, preferably ammonia-stabilized colloidal silica.
49. The process of any one of embodiments 41 to 48, wherein at least 99 weight-%, preferably at least 99.5 weight-%, more preferably at least 99.9 weight-% of the aqueous synthesis mixture prepared in (i.1) consist of water, the boron source, the silicon source, and the MWW template compound.
50. The process of any one of embodiments 41 to 49, wherein in (i.2), the hydrothermally synthesizing is carried out at a temperature of the aqueous synthesis mixture in the range of from 160 to less than 180° C., preferably in the range of from 170 to 177° C.
51. The process of any one of embodiments 41 to 50, wherein in (i.2), the hydrothermally synthesizing is carried out for a period of time in the range of from 1 to 72 h, preferably in the range of from 6 to 60 h, more preferably in the range of from 12 to 50 h.
52. The process of any one of embodiments 41 to 51, wherein in (i.2), the hydrothermally synthesizing is carried out in a closed system under autogenous pressure.
53. The process of any one of embodiments 41 to 52, wherein the solid-liquid separation method used in (i.3) comprises subjecting the mother liquor comprising water, the first portion of the MWW template compound, and the precursor of the boron-containing zeolitic material having framework type MWW comprising the second portion of the MWW template compound to distillation, obtaining the separated precursor of the boron-containing zeolitic material having framework type MWW and further obtaining an aqueous mixture comprising the MWW template compound.

54. The process of embodiment 53, wherein at least 99 weight-%, preferably at least 99.5 weight-%, more preferably at least 99.9 weight-% of the aqueous mixture comprising the MWW template compound obtained from distillation consist of water and the MWW template compound.
55. The process of embodiment 53 or 54, wherein the aqueous mixture comprising the MWW template compound obtained from distillation is recycled into at least one of (i.1) and (iii.2).
56. The process of any one of embodiments 41 to 52, wherein the solid-liquid separation method used in (i.3) comprises subjecting the mother liquor comprising water, the first portion of the MWW template compound, and the precursor of the boron-containing zeolitic material having framework type MWW comprising the second portion of the MWW template compound to flashing wherein the MWW template compound is flashed out and the flashed-out MWW template compound is preferably recycled into at least one of (i.1) and (iii.2).
57. The process of any one of embodiments 40 to 52, wherein the pH of the mother liquor obtained from (i.2) is above 10, preferably in the range of from 10.5 to 12, more preferably in the range of from 11 to 11.5, and wherein (i.3), the pH of the mother liquor obtained in (i.2) is adjusted to a value in the range of from 6.5 to 8.5, preferably in the range of from 7 to 8.
58. The process of embodiment 57, wherein in (i.3), the pH is adjusted by a method comprising adding an acid to the mother liquor obtained from (a) containing the precursor of the boron-containing zeolitic material having framework type MWW comprising the second portion of the MWW template compound, wherein the adding is preferably carried out at least partially under stirring.
59. The process of embodiment 58, wherein in (i.3), the adding is carried out at a temperature of the mother liquor in the range of from 10 to 70° C., preferably in the range of from 20 to 70° C., more preferably in the range of from 30 to 65° C., more preferably in the range of from 40 to 60° C.
60. The process of embodiment 58 or 59, wherein in (i.3), the acid is an inorganic acid, preferably an aqueous solution containing the inorganic acid, wherein the inorganic acid is preferably one or more of phosphoric acid, sulphuric acid, hydrochloric acid, and the inorganic acid preferably comprising, more preferably being, nitric acid.
61. The process of any one of embodiments 58 to 60, the method additionally comprising stirring the mother liquor to which the acid was added according to (i.3), wherein the stirring is preferably carried out at a temperature in the range of from 10 to 70° C., preferably in the range of from 20 to 70° C., more preferably in the range of from 25 to 65° C., more preferably in the range of from 30 to 60° C.
62. The process of any one of embodiments 57 to 61, further comprising separating the precursor of the boron-containing zeolitic material having framework type MWW from the mother liquor, preferably from the pH-adjusted mother liquor, by filtration in a filtration device.
63. The process of embodiment 62, wherein (i.3) further comprising washing the precursor of the boron-containing zeolitic material having framework type MWW, preferably the filter cake obtained according to embodiment 62, wherein the washing is preferably performed using water as washing agent.
64. The process of any embodiment 62 or 63, further comprising drying the preferably washed precursor of the boron-containing zeolitic material having framework type MWW at a temperature in the range of from 10 to 200° C., preferably in the range of from 20 to 50° C., more preferably in the range of from 20 to 40° C., more preferably in the range of from 20 to 30° C., wherein the drying is preferably carried out by subjecting the precursor of the boron-containing zeolitic material having framework type MWW to a gas stream having the temperature as defined above, preferably a nitrogen stream.
65. The process of any one of embodiments 62 to 64, preferably 63 or 64, further comprising preparing a suspension, preferably an aqueous suspension, comprising the precursor of the boron-containing zeolitic material having framework type MWW, and having a solids content in the range of from 10 to 20 weight-%, preferably in the range of from 12 to 18 weight-%, more preferably in the range of from 14 to 16 weight-%; spray-drying the suspension obtaining a spray powder comprising the precursor of the boron-containing zeolitic material having framework type MWW; calcining the spray-powder comprising the precursor of the boron-containing zeolitic material having framework type MWW, preferably at a temperature in the range of from 500 to 700° C., more preferably in the range of from 550 to 675° C., more preferably in the range of from 600 to 650° C. preferably for a period of time in the range of from 0.1 to 24 h, more preferably in the range of from 1 to 24 h, more preferably in the range of from 2 to 18 h, more preferably in the range of from 4 to 12 h, obtaining a spray-powder of which at least 99 weight-%, more preferably at least 99.5 weight-% consist of the boron-containing zeolitic material having framework type MWW.
66. The process of embodiment 65, wherein the boron content of the boron-containing zeolitic material having framework type MWW comprised in the spray-powder, calculated as elemental boron, is at least 1 weight-%, preferably in the range of from 1.0 to 2.2 weight-%, more preferably in the range of from 1.2 to 1.8 weight-%, and the silicon content of the boron-containing zeolitic material having framework type MWW comprised in the spray powder, calculated as elemental silicon, is at least 37 weight-%, preferably in the range of from 40 to 50 weight-%, more preferably from 41 to 45 weight-%, based on the total weight of the boron-containing zeolitic material having framework type MWW.
67. The process of any one of embodiments 1 to 66, wherein in (ii), the boron-containing zeolitic material having framework type MWW prepared in (i) is deboronated by treating the boron-containing zeolitic material having framework type MWW with a liquid solvent system, obtaining the deboronated zeolitic material having framework type MWW, wherein at least 99 weight-% of the zeolitic framework of the deboronated zeolitic material consist of B, Si, O and H and wherein the zeolitic framework of the deboronated zeolitic material has empty framework sites.
68. The process of embodiment 67, wherein the deboronated zeolitic material having framework type MWW obtained from (ii) has a molar ratio of boron, calculated as $B_2O_3$, relative to silicon, calculated as $SiO_2$, of at most 0.02:1, preferably at most 0.01:1, more preferably in the range of from 0.001:1 to 0.01:1, more preferably in the range of from 0.001:1 to 0.003:1, wherein preferably at least 99.5 weight-%, more preferably least 99.9 weight-% of the deboronated zeolitic material having framework type MWW consist of B, Si, O and H.
69. The process of embodiment 67 or 68, wherein in (ii), the liquid solvent system is one or more of water, methanol, ethanol, propanol, ethane-1,2-diol, propane-1,2-diol, propane-1,3-diol, and propane-1,2,3-triol, wherein preferably, the liquid solvent system does not contain an inorganic acid and an organic acid.

70. The process of any one of embodiments 67 to 69, wherein prior to (ii), the weight ratio of the liquid solvent system relative to the zeolitic material having framework type MWW is in the range of from 5:1 to 40:1, preferably in the range of from 7.5:1 to 30:1, more preferably in the range of from 10:1 to 20:1.

71. The process of any one of embodiments 67 to 70, wherein in (ii), the treating with the liquid solvent system is carried out at a temperature of the liquid solvent system in the range of from 50 to 125° C., preferably in the range of from 90 to 115° C., more preferably in the range of from 95 to 105° C.

72. The process of any one of embodiments 67 to 71, wherein in (ii), the treating with the liquid solvent system is carried out for a period in the range of from 6 to 20 h, preferably in the range of from 7 to 17 h, more preferably in the range of from 8 to 12 h.

73. The process of any one of embodiments 67 to 72, wherein in (ii), the treating with the liquid solvent system is carried out in an open system under reflux or in a closed system without reflux.

74. The process of any one of embodiments 67 to 73, wherein (ii) comprises drying, preferably spray-drying the deboronated zeolitic material having framework type MWW.

75. The process of any one of embodiments 67 to 74, wherein the deboronated zeolitic material having framework type MWW obtained from (ii) is not subjected to calcination prior to (iii).

76. The process of any one of embodiments 1 to 75, further comprising
(vi.1) treating the titanium-containing zeolitic material having framework type MWW comprising the second portion of the MWW template compound obtained from (iv) with an aqueous solution having a pH of at most 5;
(vi.2) separating the titanium-containing zeolitic material having framework type MWW obtained from (vi.1) from the aqueous solution, optionally followed by washing the separated the titanium-containing zeolitic material having framework type MWW;
(vi.3) preparing a suspension, preferably an aqueous suspension containing the titanium-containing zeolitic material having framework type MWW obtained from (vi.1), preferably from (vi.2), said suspension having a solids content preferably in the range of from 5 to 25 weight-%, more preferably from 10 to 20 weight-%, based on the total weight of the suspension, and subjecting the suspension to spray-drying;
(vi.4) calcining the titanium-containing zeolitic material having framework type MWW obtained from (vi.1), preferably from (vi.2), more preferably from (vi.3), wherein the calcining is preferably carried out at a temperature in the range of from 400 to 800° C., more preferably from 600 to 700° C.

77. A titanium-containing zeolitic material having framework type MWW, obtainable or obtained by a process according to any one of embodiments 1 to 76, preferably according to embodiment 76.

78. Use of the titanium-containing zeolitic material having framework type MWW according to embodiment 77 as a catalyst, as a catalyst support, or as a catalyst precursor.

79. The use of embodiment 78, wherein the titanium-containing zeolitic material having framework type MWW is used as a catalyst for the epoxidation of an olefin, wherein at least one precious metal is optionally contained in or supported on the titanium-containing zeolitic material having framework type MWW.

80. The use of embodiment 78, wherein the titanium-containing zeolitic material having framework type MWW is used as a catalyst precursor in a process for preparing a catalyst, wherein the process for preparing the catalyst comprises impregnating the titanium-containing zeolitic material having framework type MWW with at least one zinc containing compound and optionally forming the impregnated titanium-containing zeolitic material having framework type MWW to a molding, said molding optionally containing at least one binder, preferably a silica binder.

81. A method for catalytically converting a hydrocarbon compound comprising bringing the hydrocarbon compound in contact with a catalyst comprising the titanium-containing zeolitic material having framework type MWW according to embodiment 77.

82. The method of embodiment 81, wherein the hydrocarbon conversion is an epoxidation of an olefin, wherein at least one precious metal is optionally contained in or supported on the zeolitic material having framework type MWW.

83. A method for preparing a catalyst, comprising impregnating the titanium-containing zeolitic material having framework type MWW with at least one zinc containing compound and optionally forming the impregnated titanium-containing zeolitic material having framework type MWW to a molding, said molding optionally containing at least one binder, preferably a silica binder.

The present invention is further illustrated in the following reference examples, examples, and comparative examples.

EXAMPLES

Reference Example 1

Determination of Characteristics of a Zeolitic Material Having Framework Type MWW 1.1 BET specific surface area The BET specific surface area was determined from N2 adsorption desorption isotherms performed at 77 K. The BET (Brunner-Elmer-Teller) specific surface area was measured with DIN 66131, additional information not within this specification regarding the pore volumes (mesopore volume) and pore size (mesopore size) was derived from DIN 66134.

1.2 Crystallinity

The crystallinity and the lattice parameters of the zeolitic materials were determined by XRD analysis. The data were collected using a standard Bragg-Brentano diffractometer with a Cu-X-ray source and an energy dispersive point detector. The angular range of 2° to 70° (2 theta) was scanned with a step size of 0.02°, while the variable divergence slit was set to a constant illuminated sample length of 20 mm. The data were then analyzed using TOPAS V4 software, wherein the sharp diffraction peaks were modeled using a Pawley fit containing a unit cell with the following starting parameters: a=14.4 Angstrom and c=25.2 Angstrom in the space group P6/mmm. These were refined to fit the data. Independent peaks were inserted at the following positions: 8.4°, 22.4°, 28.2° and 43°. These were used to describe the amorphous content. The crystalline content describes the intensity of the crystalline signal to the total scattered intensity. Included in the model were a linear background, Lorentz and polarization corrections, lattice parameters, space group and crystallite size.

1.3 Water Adsorption

The water adsorption/desorption isotherms measurements were performed on a VTI SA instrument from TA Instruments following a step-isotherm program. The experiment consisted of a run or a series of runs performed on a sample material that has been placed on the microbalance pan inside of the instrument. Before the measurement was started, the residual moisture of the sample was removed by heating the sample to 100° C. (heating ramp of 5° C./min) and holding it for 6 h under a $N_2$ flow. After the drying program, the temperature in the cell was decreased to 25° C. and kept isothermal during the measurements. The microbalance was calibrated, and the weight of the dried sample was balanced (maximum mass deviation 0.01 weight-%). Water uptake by the sample was measured as the increase in weight over that of the dry sample. First, an adsorption curve was measured by increasing the relative humidity (RH) (expressed as weight-% water in the atmosphere inside of the cell) to which the samples was exposed and measuring the water uptake by the sample at equilibrium. The RH was increased with a step of 10% from 5% to 85% and at each step the system controlled the RH and monitored the sample weight until reaching the equilibrium conditions and recording the weight uptake. The total adsorbed water amount by the sample was taken after the sample was exposed to the 85% RH. During the desorption measurement the RH was decreased from 85% to 5% with a step of 10% and the change in the weight of the sample (water uptake) was monitored and recorded.

Reference Example 2

Preparation of a Deboronated Zeolitic Material Having Framework Type MWW 480 kg de-ionized water were provided in a vessel. Under stirring at 70 rpm (revolutions per minute), 166 kg boric acid were suspended in the water at room temperature. The suspension was stirred for another 3 h at room temperature. Subsequently, 278 kg piperidine were added, and the mixture was stirred for another hour. To the resulting solution, 400 kg Lu-dox® AS-40 were added, and the resulting mixture was stirred at 70 rpm for another hour at room temperature. The finally obtained mixture was transferred to a crystallization vessel and heated to 170° C. within 5 h under autogenous pressure and under stirring (50 rpm). The temperature of 170° C. was kept essentially constant for 120 h. During these 120 h, the mixture was stirred at 50 rpm. Subsequently, the mixture was cooled to a temperature of from 50-60° C. The aqueous suspension containing B-MWW had a pH of 11.3 as determined via measurement with a pH-sensitive electrode. From said suspension, the B-MWW was separated by filtration. The filter cake was then washed with de-ionized water at room temperature until the washing water had a conductivity of less than 500 microSiemens/cm. The thus obtained filter cake was subjected to spray-drying in a spray-tower with the following spray-drying conditions:

| drying gas, nozzle gas: | technical nitrogen |
|---|---|
| temperature drying gas: | |
| temperature spray tower (in): | 235° C. |
| temperature spray tower (out): | 140° C. |
| nozzle: | |
| top-component nozzle | supplier Gerig; size 0 |
| nozzle gas temperature: | room temperature |
| nozzle gas pressure: | 1 bar |
| operation mode: | nitrogen straight |
| apparatus used: | spray tower with one nozzle |
| configuration: | spray tower-filter-scrubber |
| gas flow: | 1,500 kg/h |
| filter material: | Nomex ® needle-felt 20 m² |
| dosage via flexible tube pump: | SP VF 15 (supplier: Verder) |

The spray tower was comprised of a vertically arranged cylinder having a length of 2,650 mm, a diameter of 1,200 mm, which cylinder was conically narrowed at the bottom. The length of the conus was 600 mm. At the head of the cylinder, the atomizing means (a two-component nozzle) were arranged. The spray-dried material was separated from the drying gas in a filter downstream of the spray tower, and the drying gas was then passed through a scrubber. The suspension was passed through the inner opening of the nozzle, and the nozzle gas was passed through the ring-shaped slit encircling the opening.

The spray-dried material was then subjected to calcination at 650° C. in a rotary oven in contracurrent flow (0.8-1 kg/h). The calcined material had a molar ratio B content of 1.4 weight-%, Si 43 weight-% and C<0.1 weight-%. The crystallinity of the material was 88% and the BET specific surface area measured according to DIN 66131 was 468 $m^2/g$.

1,590 kg of de-ionized water and 106 kg g of the calcined material were refluxed at 100° C. under stirring at 70 rpm for 10 h. The resulting deboronated zeolitic material was separated from the suspension by filtration and washed 4 times with 150 L deionized water at room temperature. After the filtration, the filter cake was dried at a temperature of 120° C. for 16 h.

The dried zeolitic material having an MWW framework structure had a B content of 0.04 weight-%, a Si content of 42 weight-%, a crystallinity of 82% and a BET specific surface area of 462 $m^2/g$.

Example 1

Preparing a Zeolitic Material Having Framework Type MWW Using a Recycled MWW Template Compound 1.1 Preparation of a titanium-containing zeolitic material having framework type MWW with separation of the MWW template compound Starting materials:
deionized water (26.30 kg)
piperidine (9.70 kg; Aldrich 10,409-4, Lot.-Nr. S 3088)
tetrabutylorthotitanate (1.37 kg)
dried deboronated zeolitic material having an MWW framework structure obtained according to Reference Example 2 above (6.40 kg)

25 kg of the deionized water and the dried deboronated zeolitic material having an MWW framework structure were admixed in a vessel and the thus obtained mixture was filled in an autoclave. The tetrabutylorthotitanate was dissolved in the piperidine, and the mixture was admixed with the mixture of the water and the dried deboronated zeolitic material having an MWW in the autoclave under stirring at 180 rpm, followed by a final rinsing with 1.3 kg deionized water. The resulting mixture was then stirred for 1 h at 180 rpm. Within 11 h, the mixture in the autoclave was heated to a temperature of 170° C. and kept at this temperature for 48 h under autogenous pressure. After the hydrothermal synthesis, the obtained suspension was cooled to room temperature.

1.2 Separation of the MWW Template Compound

The liquid phase obtained from 1.1 was subjected to distillation. For distillation, a column having an internal diameter of 30 mm and equipped with wire gauze packings (Montz A3/1000, packing height 1.65 m) was used.

First, 300 g of the mother liquor from which the solids had been separated, obtained as described in section a) above, were admixed with with an acidic aqueous solution (sulphuric acid, 20 weight-% in water) until the molar ratio sulphuric acid:piperidine was 1.1:1. Then, the mixture was introduced into the sump vessel which was heated to a temperature of about 93 to 100° C. The column was then operated without reflux until the amount of the first fraction exceeded 10 mL. Then, the reflux ratio was increased to 2 and about 100 mL were taken as a second fraction. The second fraction had the following composition: $H_2O$ (53 weight-%), 1-butanol (47 weight-%), piperidine (<0.1 weight-%).

Subsequently, the sump mixture was cooled down to a temperature of 30° C. and a basic aqueous solution (caustic soda ($Na_2SO_4$), 15 weight-% in water) was added so that the molar ratio of caustic soda:sulphuric acid was 2:1. Thereafter, the sump vessel was heated up again to a temperature of about 93 to 100° C. and several fractions rich of piperidine were withdrawn. These fractions had the following mean composition: $H_2O$ (36.4 weight-%), piperidine (63 weight-%), 1-butanol (<0.1 weight-%).

1.3 Preparation of a Boron-Containing Zeolitic Material Having Framework Type MWW Using The Separated MWW Template Compound a) Starting Materials:
deionized water (313 g)
piperidine (62.5 weight-% in water, a piperidine fraction obtained as described in section 1.2 above)
boric acid (166 g)
Ludox® AS40 (400 g; 40 weight-% $SiO_2$ in water)

In a vessel, a mixture of the water, the piperidine and the boric acid was prepared unter stirring at 160 rpm. The mixture was stirred for 20 min. To the thus obtained solution, the Ludox® AS40 was admixed, and the resulting mixture was stirred for 2 h at 160 rpm. The pH of the obtained mixture was 11.5. The liquid gel was then transferred into an autoclave and subjected to hydrothermal crystallization (heating ramp: within 2 h to a temperature of 175° C.; keeping the mixture at 175° C. for 48 h under stirring at 100 rpm). After cooling, the obtained suspension having a pH of 11.3 was removed from the autoclave and brought to a pH in the range of from 7 to 8 using 1,300 g aqueous $HNO_3$ (10 weight-% in water). Then, the suspension was subjected to filtration (suction filter), and the filter cake was washed with 10 L deionized water. The washed filter cake was dried for 16 h at 120° C. under air and calcined at 650° C. for 5 h under air. 161 g calcined boron-containing zeolitic material having framework type MWW were obtained.

The obtained boron-containing zeolitic material having framework type MWW had a boron content of 1.4 weight-%, a silicon content of 46 weight-%, a total organic carbon (TOC) content of <0.1 weight-% and a crystallinity of 85%. The BET specific surface area determined via nitrogen adsorption at 77 K according to DIN 66131 was 484 $m^2$/g. The water adsorption of the material as determined according to Reference Example 1.3 above was 20 weight-%.

b) Starting Materials:
deionized water (324 g)
piperidine (64 weight-% in water, a piperidine fraction obtained as described in section 1.2 above)
boric acid (166 g)
Ludox® AS40 (400 g; 40 weight-% $SiO_2$ in water)

In a vessel, a mixture of the water, the piperidine and the boric acid was prepared under stirring at 160 rpm. The mixture was stirred for 20 min. To the thus obtained solution, the Ludox® AS40 was admixed, and the resulting mixture was stirred for 2 h at 160 rpm. The pH of the obtained mixture was 11.5. The liquid gel was then transferred into an autoclave and subjected to hydrothermal crystallization (heating ramp: within 2 h to a temperature of 175° C.; keeping the mixture at 175° C. for 48 h under stirring at 100 rpm). After cooling, the obtained suspension having a pH of 11.3 was removed from the autoclave and brought to a pH in the range of from 7 to 8 using 1,300 g aqueous $HNO_3$ (10 weight-% in water). Then, the suspension was subjected to filtration (suction filter), and the filter cake was washed with 10 L deionized water. The washed filter cake was dried for 16 h at 120° C. under air and calcined at 650° C. for 5 h under air. 162 g calcined boron-containing zeolitic material having framework type MWW were obtained.

The obtained boron-containing zeolitic material having framework type MWW had a boron content of 1.4 weight-%, a silicon content of 45.5 weight-%, a total organic carbon (TOC) content of <0.1 weight-% and a crystallinity of 85%. The BET specific surface area determined via nitrogen adsorption at 77 K according to DIN 66131 was 477 $m^2$/g. The water adsorption of the material as determined according to Reference Example 1.3 above was 20 weight-%.

Comparative Example 1

Preparing a Boron-Containing Zeolitic Material Having Framework Type MWW Using a Fresh MWW Template Compound Starting materials:
deionized water (517.4 g)
piperidine (299.2 g; Aldrich 10,409-4, Lot.-Nr. S 30885)
boric acid (178.8 g)
Ludox® AS40 (431.2 g; 40 weight-% $SiO_2$ in water)

The deionized water was provided in a vessel. Under stirring at 100 rpm, the piperidine was added and the resulting mixture was stirred for 10 min. Then, the boric acid was added and the resulting mixture was stirred for 20 min. Then, the Ludox® AS40 was added and the resulting mixture was stirred for 30 min. The mixture was then transferred into an autoclave and subjected to hydrothermal crystallization (heating ramp: within 90 min to a temperature of 175° C.; keeping the mixture at 175° C. for 48 h under stirring at 100 rpm). After cooling, the obtained suspension was removed from the autoclave and brought to a pH in the range of from 7 to 8 using an aqueous $HNO_3$ (10 weight-% in water). Then, the suspension was subjected to filtration (suction filter), and the filter cake was washed with deionized water. The washed filter cake was dried for 4 h at 120° C. under air and calcined at 650° C. for 4 h under air. 178 g calcined boron-containing zeolitic material having framework type MWW were obtained.

The obtained boron-containing zeolitic material having framework type MWW had a boron content of 1.3 weight-%, a silicon content of 43 weight-%, a total organic carbon (TOC) content of <1 weight-% and a crystallinity of 82%. The BET specific surface area determined via nitrogen adsorption at 77 K according to DIN 66131 was 436 m$^2$/g. The water adsorption of the material as determined according to Reference Example 1.3 above was 16 weight-%.

Example 2

Comparison of the Obtained Boron-Containing Zeolitic Material Having Framework Type MWW

| Zeolitic materuial according to | Piperidine | B content/ weight-% | Si content/ weight-% | Crystallinity/ % | BET specific surface area/ m$^2$/g |
|---|---|---|---|---|---|
| Comp. Ex. 1 | Fresh | 1.3 | 43 | 82 | 436 |
| Ex. 1.3 b) | Re-used | 1.4 | 45.5 | 85 | 477 |
| Ex. 1.3 a) | Re-used | 1.4 | 46 | 85 | 484 |

CITED LITERATURE

WO 2013/117536 A1

The invention claimed is:

1. A process for preparing a titanium-containing zeolitic material having framework type MWW, the process comprising
   (i) preparing a boron-containing zeolitic material having framework type MWW, wherein at least 99 weight-% of the zeolitic framework consist of B, Si, O and H, and wherein for preparing the boron-containing zeolitic material having framework type MWW, an MWW template compound is employed;
   (ii) deboronating the boron-containing zeolitic material having framework type MWW prepared in (i), obtaining a deboronated zeolitic material having framework type MWW, wherein at least 99 weight-% of the zeolitic framework of the deboronated zeolitic material consist of B, Si, O and H and wherein the zeolitic framework of the deboronated zeolitic material has empty framework sites;
   (iii) incorporating titanium into the deboronated zeolitic material obtained from (ii), comprising
      (iii.1) preparing an aqueous synthesis mixture containing the deboronated zeolitic material obtained from (ii), a titanium source, and an MWW template compound, wherein in the aqueous synthesis mixture obtained from (iii.1), the molar ratio of the MWW template compound relative to Si, calculated as SiO$_2$ and comprised in the deboronated zeolitic material obtained from (ii), is at least 0.5:1;
      (iii.2) hydrothermally synthesizing a titanium-containing zeolitic material having framework type MWW from the aqueous synthesis mixture prepared in (iii.1), obtaining a mother liquor comprising water, a first portion of the MWW template compound employed in (iii.1), and a titanium-containing zeolitic material having framework type MWW comprising a second portion of the MWW template compound employed in (iii.1);
   (iv) separating the titanium-containing zeolitic material having framework type MWW comprising the second portion of the MWW template compound from the mother liquor using a solid-liquid separation method, obtaining an aqueous mixture comprising the first portion of the MWW template compound and further obtaining the separated titanium-containing zeolitic material having framework type MWW comprising the second portion of the MWW template compound; and
   (v) recycling the first portion of the MWW template compound comprised in the aqueous mixture obtained from (iv) into at least one of (i) and (iii.2),
   wherein in (iii.1), the titanium source is tetra-n-butylorthotitanate and the MWW template compound is piperidine, wherein the mother liquor obtained in (iii.2) comprises water, the first portion of the piperidine, the titanium-containing zeolitic material having framework type MWW comprising the second portion of the piperidine, and n-butanol, and wherein the aqueous mixture obtained in (iv) comprises the first portion of the piperidine and n-butanol and after (iv) and before (v) separating the n-butanol from the aqueous mixture obtained in (iv) by a process comprising:
      (x.1) transferring the piperidine comprised in the aqueous mixture obtained in (iv) into a piperidine salt, comprising adding a piperidine salt-forming compound to the aqueous mixture obtained in (iv), obtaining an aqueous mixture comprising the piperidine salt and n-butanol; and
      (x.2) subjecting the aqueous mixture obtained from (x.1) to distillation in a distillation column, obtaining a top fraction being enriched in n-butanol, compared to the aqueous mixture obtained from (x.1), and obtaining a bottoms fraction being enriched in water and the the piperidine salt, compared to the aqueous mixture obtained from (x.1).

2. The process of claim 1, wherein the piperidine salt-forming compound added in (x.1) comprises an inorganic acid or an organic acid or an inorganic and an organic acid.

3. The process of claim 1, wherein the piperidine salt-forming compound added in (x.1) comprises sulphuric acid.

4. The process of claim 1, wherein the distillation in (x.2) is carried out at a pressure at the top of the distillation column in the range of from 10 mbar to 100 bar.

5. The process of claim 1, wherein the distillation in (x.2) is carried out at a temperature of the bottoms of the distillation column in the range of from 0 to 320° C.

6. The process of claim 5, further comprising
   (x.3) transferring the piperidine salt comprised in the bottoms fraction obtained in (x.2) into piperidine and a further salt, comprising adding a salt-forming compound to the bottoms fraction, obtaining an aqueous mixture comprising the piperidine and the further salt; and
   (x.4) subjecting the aqueous mixture obtained from (x.3) to distillation in a distillation column, obtaining a top fraction being enriched in water and piperidine, compared to the aqueous mixture obtained from (x.3), and obtaining a bottoms fraction being enriched in the further salt, compared to the aqueous mixture obtained from (x.3).

7. The process of claim 6, wherein the salt-forming compound added in (x.3) comprises an inorganic base or an organic base or an inorganic and an organic base.

8. The process of claim 6, wherein the salt-forming compound added in (x.3) comprises sodium hydroxide.

9. The process of claim 6, wherein the distillation in (x.4) is carried out at a pressure at the top of the distillation column in the range of from 10 mbar to 100 bar.

10. The process of claim 6, wherein the distillation in (x.4) is carried out at a temperature of the bottoms of the distillation column in the range of from 0 to 320° C.

11. The process of claim 6, wherein (v) comprises recycling the piperidine comprised in the top fraction obtained in (x.4) into at least one of (i) and (iii.2).

12. The process of claim 6, wherein (v) comprises recycling the top fraction obtained in (x.4) into at least one of (i) and (iii.2).

13. The process of claim 1, wherein preparing the boron-containing zeolitic material having framework type MWW in (i) comprises (i.1) preparing an aqueous synthesis mixture comprising a silicon source, a boron source, and the MWW template compound; wherein in the aqueous synthesis mixture obtained from (iii.1) the molar ratio of the MWW template compound relative to Si, calculated as $SiO_2$ and comprised in the silicon source, is at least 0.4:1;
(i.2) hydrothermally synthesizing a precursor of the boron-containing zeolitic material having framework type MWW from the aqueous synthesis mixture prepared in (i.1), obtaining a mother liquor comprising water, a first portion of the MWW template compound, and the precursor of the boron-containing zeolitic material having framework type MWW comprising a second portion of the MWW template compound;
(i.3) separating the precursor of the boron-containing zeolitic material having framework type MWW comprising the second portion of the MWW template compound from the mother liquor using a solid-liquid separation method, obtaining the separated precursor of the boron-containing zeolitic material having framework type MWW; and
(i.4) calcining the separated precursor of the boron-containing zeolitic material having framework type MWW, obtaining the boron-containing zeolitic material having framework type MWW.

14. The process of claim 1, wherein deboronating the boron-containing zeolitic material having framework type MWW in (ii) comprises treating the boron-containing zeolitic material having framework type MWW with a liquid solvent system, wherein the liquid solvent system is at least one selected from the group consisting of water, methanol, ethanol, propanol, ethane-1,2-diol, propane-1,2-diol, propane-1,3-diol, and propane-1,2,3-triol, wherein the liquid solvent system does not contain an inorganic acid and an organic acid.

15. A titanium-containing zeolitic material having framework type MWW, obtained by a process according to claim 1.

16. A method for catalytically converting a compound comprising bringing the compound in contact with a catalyst comprising the titanium-containing zeolitic material having framework type MWW of claim 15.

17. A method for preparing a catalyst comprising impregnating the titanium-containing zeolitic material having framework type MWW of claim 15 with at least one precious metal or zinc.

* * * * *